INVENTORS
JOHN P. RICH
LAWRENCE A. CARLSMITH
BY
ATTORNEY

July 1, 1969  J. P. RICH ET AL  3,452,875
PIPELINE THICKENER

Filed Dec. 29, 1967  Sheet 4 of 5

INVENTORS
JOHN P. RICH
AWRENCE A. CARLSMITH
BY

David W. Tillotson
ATTORNEY

United States Patent Office 3,452,875
Patented July 1, 1969

3,452,875
PIPELINE THICKENER
John P. Rich, Nashua, and Lawrence Allan Carlsmith, Amherst, N.H., assignors to Improved Machinery Inc., Nashua, N.H., a corporation of Delaware
Filed Dec. 29, 1967, Ser. No. 694,455
Int. Cl. B01d 35/22
U.S. Cl. 210—392          23 Claims

ABSTRACT OF THE DISCLOSURE

A pulp dewatering or thickening device comprising a rotating screen, an inlet on one side of the screen for introducing a pulp suspension against the screen, a filtrate outlet on the other side of the screen for withdrawing a large portion of the water from the suspension and a stock outlet on the one side of the screen for exhausting the thickened pulp suspension from the device. Means is provided for cleaning the pulp from the screen as it moves past the stock outlet.

BACKGROUND OF INVENTION

This invention relates generally to an apparatus for dewatering or thickening a liquid suspension of solid particles and more particularly to an apparatus for thickening a dilute pulp suspension, i.e., a pulp suspension having less than one percent fibers by weight. This apparatus is known as a "filter" in the pulp art since it separates liquid from pulp fibers. It should be distinguished from a "screen" which separates pulp from larger materials such as knots, shives and other debris.

Heretofore, it has been the usual practice to thicken highly dilute pulp suspensions by using conventional filtering apparatus, such as drum filters and disc filters. However, in order to handle the large amounts of filtrate involved, conventional filtering apparatus must be unduly large and expensive. One will appreciate the amount of filtrate involved when it is recognized that one half the filtrate must be removed from a one-half percent suspension to thicken it to a one percent suspension.

A prior art example of an apparatus that attempted to solve the foregoing problem is disclosed in U.S. Patent No. 3,241,676.

SUMMARY OF INVENTION

The principal object of this invention is to provide a novel apparatus which substantially overcomes or minimizes the foregoing problem.

Other important objects of the invention are: to provide a thickener which is relatively compact and economical in initial cost and operation; to provide a relatively trouble-free apparatus for thickening a pulp suspension; to provide a novel thickener that efficiently and effectively cleans the solids from its screen; and to provide a means for protecting the screen or foraminous surface of a pulp filter or thickener against being "blinded" or "stapled" which interferes with cleaning the screen.

In general, the objects of this invention are attained in an apparatus including a housing containing a substantially cylindrical chamber and a rotating drum containing a circumferentially extending screen. An inlet for admitting a liquid suspension and a stock outlet are located on one side of the screen. A liquid or filtrate outlet are located on the other side of the screen. As the suspension meets the screen, the solids are deposited on the screen while the liquid passes through the screen. Means is provided on the other side of the screen for creating an increased pressure to cause a reverse flow of liquid through the screen for washing the solids from the screen. Means is further provided to cooperate with the screen cleaning means for limiting the suspension from entering the screen at an unduly high speed immediately following its cleaning to protect the screen against becoming inoperatively clogged.

BRIEF DESCRIPTION OF DRAWINGS

The invention is described in connection with the accompanying drawings wherein.

DESCRIPTION OF PREFERRED EMBODIMENTS

Figure 1:
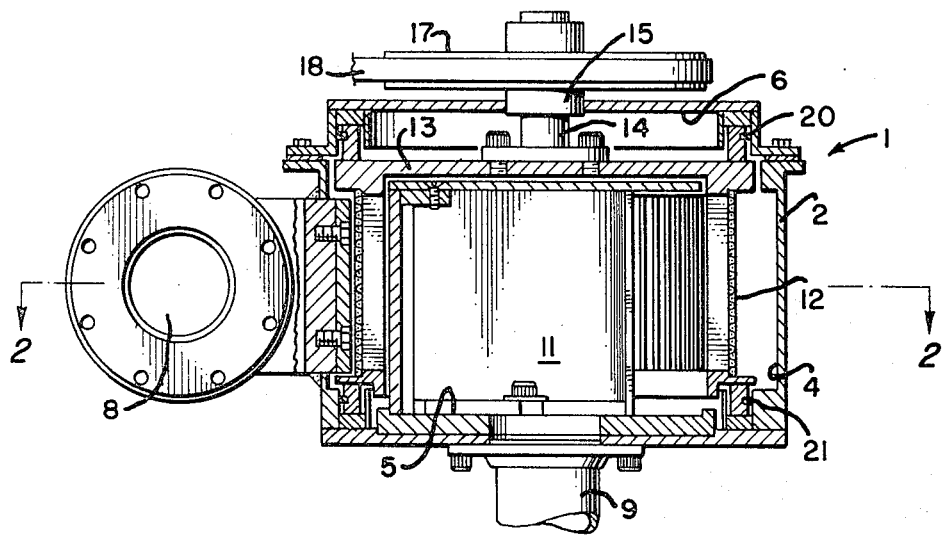
FIG. 1 is an elevational view with portions being cut away and shown in section of an embodiment of pulp thickener employing this invention.
Figure 2:
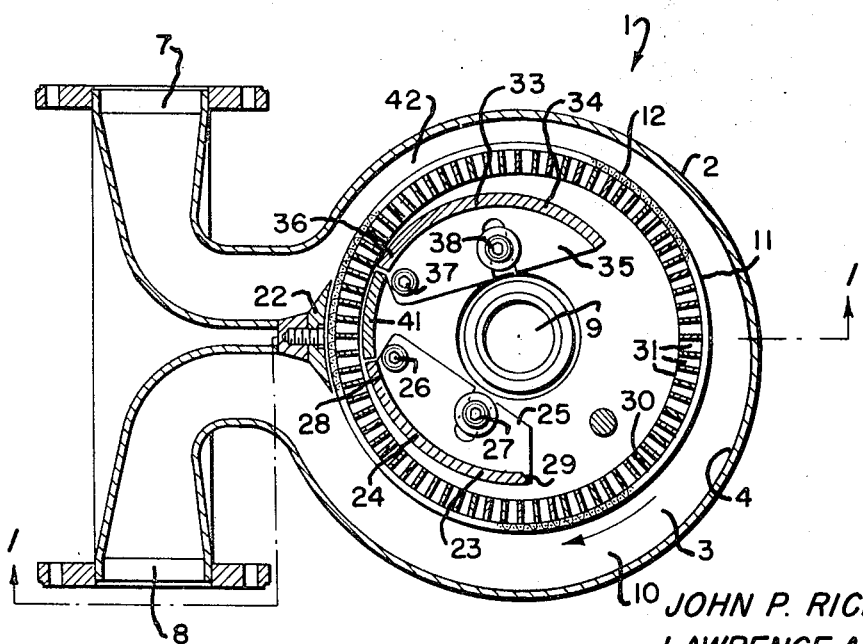
FIG. 2 is a horizontal section of the embodiment of FIG. 1 taken on line 2—2 in FIG. 1.
Figure 3:
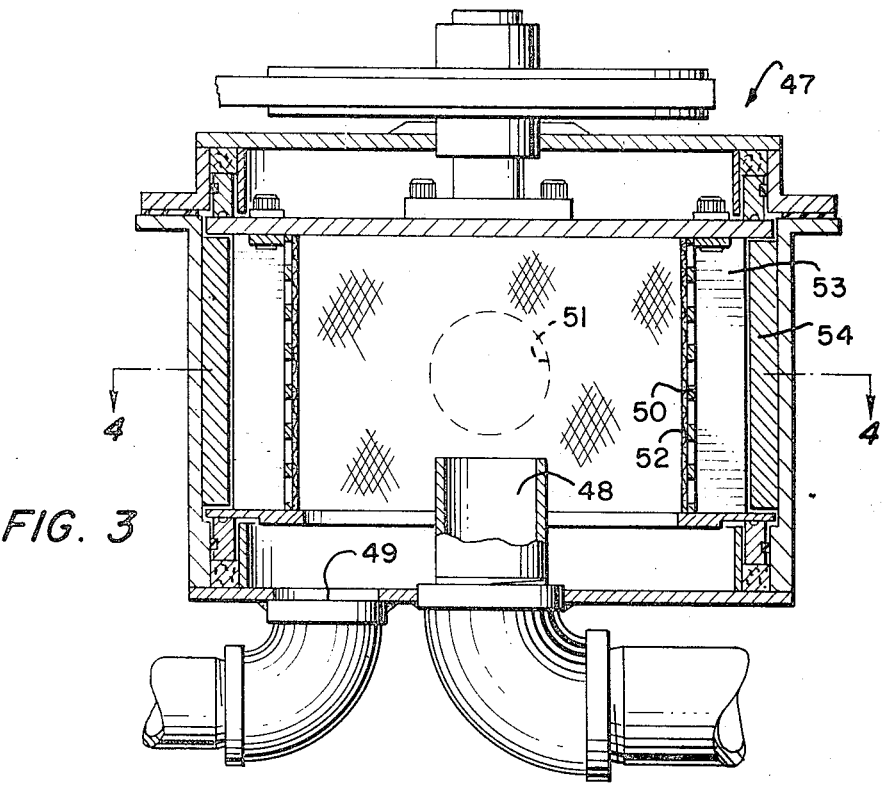
FIG. 3 is an elevational view similar to FIG. 1 illustrating a second embodiment of a pulp thickener.
Figure 4:
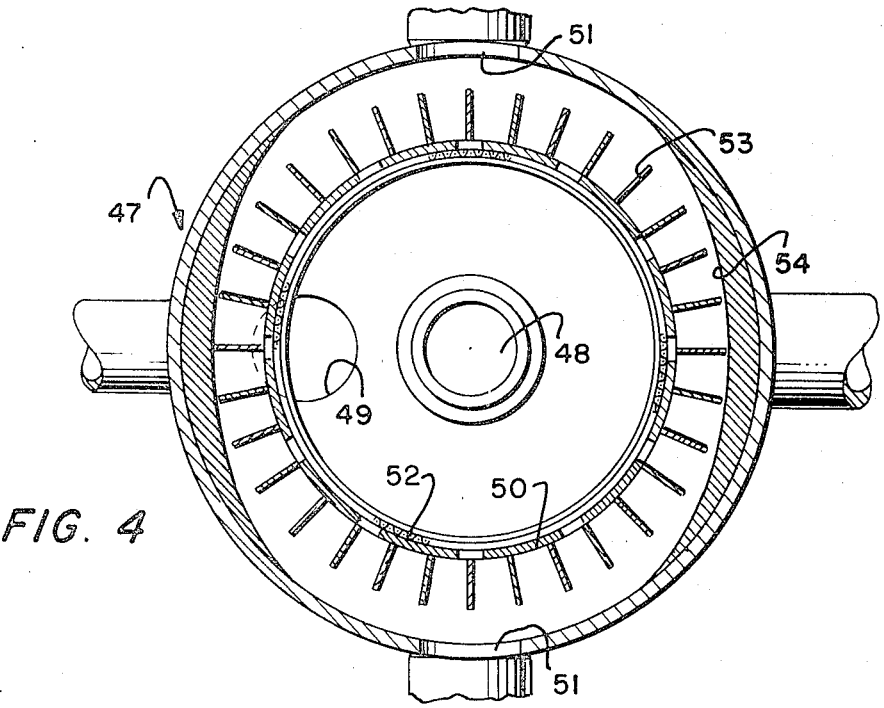
FIG. 4 is a horizontal section of the embodiment of FIG. 3 taken on line 4—4 in FIG. 3.
Figure 5:
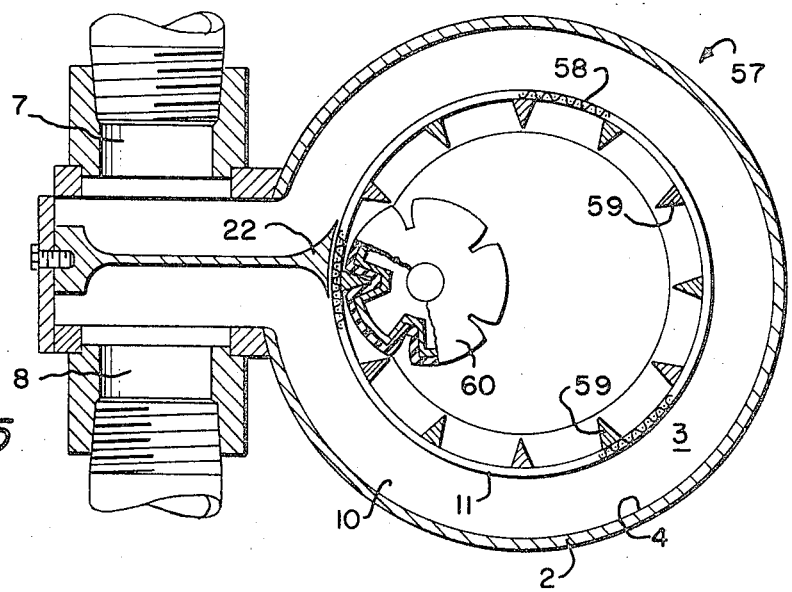
FIG. 5 is a horizontal section of a third embodiment of pulp thickener.

The first embodiment of thickener 1 shown in FIGS. 1 and 2 includes a housing 2 enclosing a substantially cylindrical chamber 3 having a periphery 4, a bottom end 5 and a top end 6. The housing 2 further contains three ports, comprising an inlet 7 for admitting the suspension of pulp stock or other solid matter into the housing, a stock outlet 8 for exhausting the thickened stock from the housing and a filtrate outlet 9 for draining away the separated liquid or filtrate from the housing 2. The thickener is operated in a manner which provides a lower pressure at the filtrate outlet 9 than the operating pressure in the chamber 3 in order to cause the filtrate to flow through the outlet 9.

An open-bottomed drum 11 is rotatively mounted in the chamber 3 to form an annular chamber 10 between the drum and the housing 2. The drum 11 includes a peripheral screen 12, a drum end 13 and an upright shaft 14. The shaft 14 is rotatively mounted in a bearing 15 mounted in the housing top 6 and carries a pulley 17 engaging a belt 18 which is driven by a suitable motor (not shown). The drum 11 carries respective top and bottom annular seals 20 and 21 engaging cooperating surfaces of the chamber 3 to isolate the periphery 4 of the chamber 3 from the bottom and top ends 5 and 6 of the chamber. The seals 20 and 21 prevent the stock from bypassing the drum screen 12 and flowing inwardly to the outlet 9.

Looking at FIG. 2, the drum 11 rotates in a clockwise direction as indicated by an arrow. The dilute suspension of pulp or the like enters the chamber 3 through the inlet port 7. Due to the reduced pressure existing at the filtrate outlet 9, the suspension is drawn onto the rotating screen 12 where the solids collect on the screen while the filtrate or liquid continues through the screen 12 to the filtrate outlet port 9. As the rotating screen nears the stock outlet 8, the solids are cleaned from the screen and are carried out of the chamber 3 through the stock outlet 8 along with a portion of the liquid or filtrate. The screen 12 includes sufficiently small perforations to be known as a "filter" in the pulp art and should be distinguished from a pulp "screen" which contains much larger openings. For example, the hole size in a pulp filter ranges from .005 to .033 inch while that of a pulp screen is .046 to .15 inch.

The inlet and stock outlet ports 7 and 8 are separated by a partition wall 22 which extends radially inward to a termination very close to the drum screen 12. The partition wall 22 aids in preventing the inlet suspension from flowing directly to the stock outlet 8 from the inlet 7 and also guides the stock cleaned from the screen into the stock outlet 8.

A baffle 23 for cleaning the drum screen 12 is mounted inside of the drum 11 adjacent the stock outlet port 8. The cleaning baffle 23 includes an upstanding arcuate wall 24 integrally fixed to a foot flange 25. The trailing edge 28 of the baffle 23 is pivoted by a pivot 26 to the bottom 5 of the chamber 3 and the baffle foot flange 25 is locked in adjusted position by a lock bolt 27. The baffle 23 is located so that the arcuate wall 24 converges with the inside of the drum screen 12 proceeding in the rotation direction of the drum 11. In FIG. 2, the drum 11 rotates clockwise as shown by the arrow.

The interior of the drum 11 is provided with a series of inwardly extending radial dividers 30 spaced around the periphery of the drum and forming a series of circumferentially spaced compartments 31 circling the interior of the screen 12. The dividers 30 cooperate with the baffle 23 to trap liquid against the interior of the drum screen 12 as the compartments 31 bordered by the dividers 30 initially pass the leading edge 29 of the baffle 23. As the compartments 31 travel further along the baffle 23, the baffle wall 24 nears the dividers 30 to place the liquid trapped in the compartments 31 under an increased pressure causing it to flow backwards through the drum screen 12. The backwards or reverse flow of liquid through the screen 12 washes any solids from the exterior of the screen 12 to prepare the screen for receiving a new layer of solid material for filtering purposes.

Also shown in FIG. 2 is a second baffle 33 which is called an inlet or restrictor baffle 33. The inlet baffle 33 includes an arcuate wall 34 and a foot flange 35 having its leading edge 36 pivoted on a pivot 37. The baffle 33 is locked in an adjusted position by a lock bolt 38. The baffle 33 progressively diverges radially inwardly away from the drum screen 12 proceeding in the direction of rotation of the drum. The inlet baffle 33 is positioned adjacent the suspension inlet 7 and serves to limit and restrict the initial flow of filtrate through the drum screen 12 as it passes the inlet 7, in order to prevent "blinding" or "stapling" of the screen 12. It has been found that if the filtrate is allowed initially to flow through the screen 12 freely, when the screen 12 is clean, the initial flow of filtrate will be so rapid that the solid matter, such as pulp, will be driven into the screen in a manner which prevents the screen 12 from being cleaned as it approaches the stock outlet 8. This phenomenon is called "blinding" or "stapling" and is undesirable because it eventually clogs the screen so bady that the apparatus must be disassembled to clean or replace the screen 12.

The cleaning baffle 23 and the inlet baffle 33 are interconnected by a fixedly mounted bridge baffle 41 which serves as an extension of the inlet baffle 33, to prevent filtrate from flowing around the leading edge 36 of the inlet baffle 33. The bridge baffle also aids in preventing undue turbulence in the chamber 3 which would likely result if the bridge baffle 41 were eliminated.

FIG. 2 illustrates the substantially involute shape of the annular chamber 10 formed between the drum 11 and the housing 2. This involute shaped chamber 10 is arranged with its smaller cross-sectional area located near the inlet 7. Thus the cross-sectional area of the chamber 10 progressively increases proceeding from the inlet 7 to the stock outlet 8. This increase in flow area between the drum 11 and the casing 2 is provided to prevent the pressure in the housing from being raised near the stock outlet by the rotating drum; it is believed that this progressive increase in flow area allows a portion of the suspension near the stock outlet 8 to circulate rearwardly (counter-clockwise in FIG. 2) in the chamber 10, thus eliminating a pressure build-up adjacent the stock outlet 8.

Looking at FIG. 2, the portion of the annular chamber 10 adjacent the inlet 7 is known as the throat 42. The cross-sectional area of the throat 42 is dimensioned approximately to increase the speed of the suspension entering the annular chamber 10 to the peripheral speed of the drum 11. It is felt that moving the suspension at a speed equal to the peripheral speed of the drum is a further aid in preventing "stapling" or "blinding" of the drum screen 12.

OPERATION

Assuming that the drum 11 is rotating in a clockwise direction as shown in FIG. 2, a dilute liquid suspension of solid material is fed into the inlet 7. From the inlet, the suspension flows past the partition 22 and onto the rotating screen 12. Initially, the liquid flow through the screen 12 is restricted by the inlet baffle 33 to prevent the screen from being prematurely clogged or "blinded." As the solid material is deposited on the screen 12, it soon limits liquid flow through the screen to a point where the inlet baffle 33 is no longer needed.

Meanwhile, liquid passing through the screen 12 flows through the filtrate outlet 9. Uutimately the screen 12 moves past the inlet baffle and continues its rotation while the solid material continues to build up on the screen. During these parts of the cycle a rotating ring of filtrate is developed just inside of the drum 11 because inwardly-flowing filtrate is forced to rotate at nearly the speed of the drum by action of the dividers 30. Eventually, the screen moves past the leading edge 29 of the cleaning baffle 23 which begins to trap the rotating ring of liquid and force it back into the compartments 31 located between the radial dividers 30. As the baffle 23 progressively nears the dividers 30, it forces the liquid trapped in the compartments to reverse its flow and to flow radially outwardly through the screen 12. This reverse flow cleans the solid material from the screen adjacent the stock outlet 8. As the solid matter leaves the screen, it is carried into the stock outlet 8 with a portion of the liquid. Since only a portion of the liquid initially entering the chamber 3 is removed through the filtrate outlet 9, the stock leaving through the stock outlet 8 is substantially thickened. In general, if the suspension entering the thickener is one half percent the weight of solid matter, the stock leaving will be thickened to a range of one to six percent of solid matter. These relative proportions can be readily varied by changing the pressure difference between the casing and the filtrate outlet or the ratio of feed stock to filtrate flows.

EXAMPLES

A laboratory model was constructed similar to the embodiment shown in FIGS. 1 and 2 and having a drum diameter of 7½ inches. Two examples of satisfactory operating conditions of this model are provided below.

*Example I*

Stock—bleached softwood kraft pulp
Inlet stock consistency, inlet 7—.5%
Thickened stock consistency, outlet 8—2.0%
Filtrate consistency, outlet 9—.02%
Filtrate flow rate—175 g.p.m./sq. ft. of filter surface
Drum speed—675 r.p.m.
Pressure difference between inlet 7 and filtrate outlet 9—6 ft. water.

The foregoing consistency percentages are based on the weight of pulp relative to the weight of the filtrate.

*Example II*

Stock—bleached softwood kraft pulp
Inlet stock consistency, inlet 7—.5%
Thickened stock consistency, outlet 8—3.75%
Filtrate consistency, outlet 9—.03%

Filtrate flow rate—110 g.p.m./sq. ft. filter surface
Drum speed—675 r.p.m.
Pressure difference between inlet 7 and filtrate outlet 9—6 ft. water.

An example of satisfactory operating conditions for a larger machine having a drum diameter of 20 inches is set forth below as a third example.

*Example III*

Stock—softwood kraft pulp
Inlet stock consistency, inlet 7—.5%
Thickened stock consistency, outlet 8—3.0%
Filtrate consistency, outlet 9—.03%
Filtrate flow rate—133 g.p.m./sq. ft. filter surface
Drum speed—330 r.p.m.
Pressure difference between inlet 7 and filtrate outlet 9—10 ft. water.

SECOND EMBODIMENT, FIGS. 3 AND 4

In this embodiment of thickener 47, the inlet 48 and stock outlet 49 are positioned inside of the rotating drum 50 and the filtrate outlet 51 are located on the outside of the drum 50. The drum 50 has a circumferential screen 52 carrying a series of circumferentially spaced outwardly extending radial dividers 53 cooperating with a pair of cleaning baffles 54 located around the screen 52 adjacent the stock outlets 49. This embodiment contains two filtrate outlets 51 and stock outlet 49.

The baffles 54 cooperate with the dividers 53 to clean the screen 52 using a reverse flow of liquid in substantially the same manner as in the first embodiment, except that the reverse flow is radially inward.

THIRD EMBODIMENT, FIG. 5

The third embodiment 57 is similar to the first embodiment except the solid material is cleaned from the drum screen 58 by the engagement between a series of dividers 59 positioned around the interior of the screen 58 and a longitudinally slotted roller 60. As the drum rotates, the roller 60 rotates with it and the dividers 59 engage the slots in the roller 60 to trap liquid between adjacent dividers 59 and to create a reverse flow of liquid radially outward through the screen 58. As in the first embodiment, this reverse flow washes the solid matter from the screen 58, however in this case the reverse flow is obtained by mechanical displacement rather than from the velocity of the rotating ring of filtrate of the first embodiment.

FOURTH EMBODIMENT, FIGS. 6 AND 7

Figure 6:
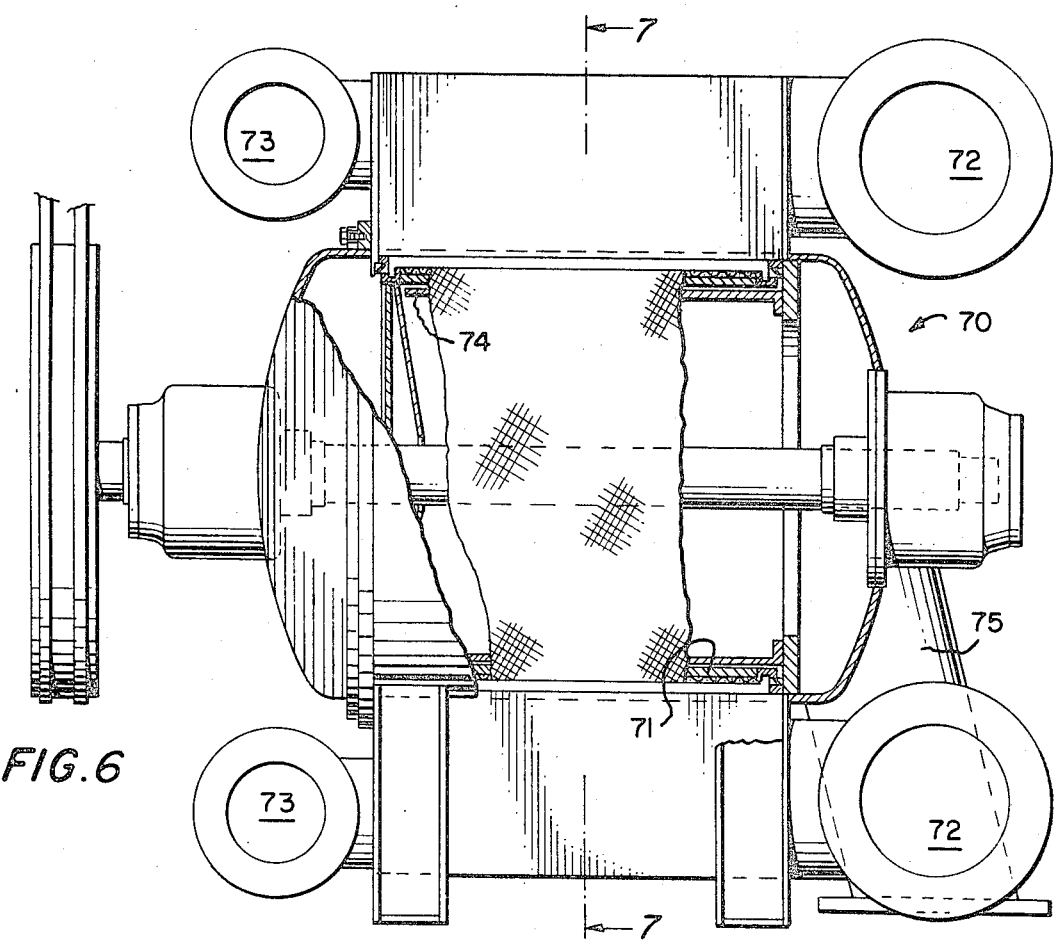
FIG. 6 is an elevational view with portions cut away of another embodiment of pulp thickener.
Figure 7:
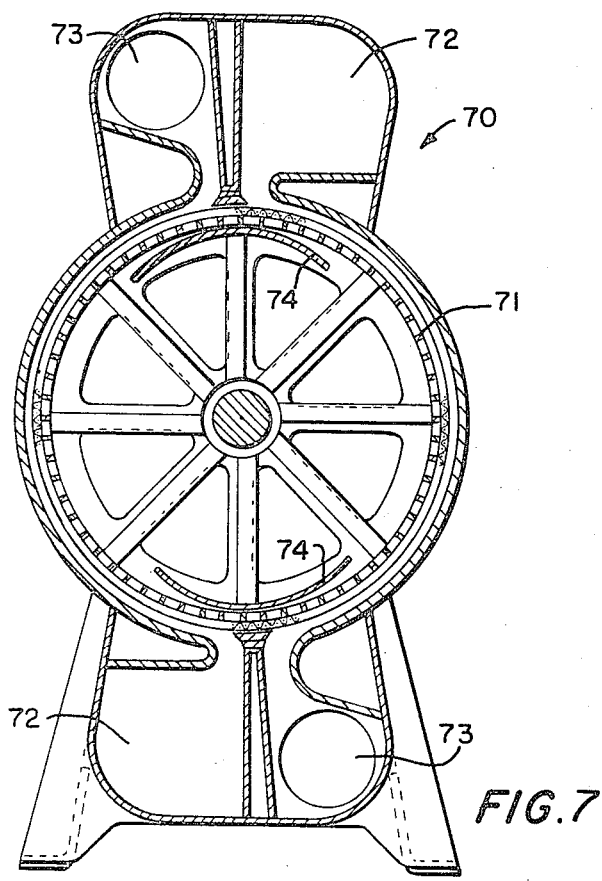
FIG. 7 is a vertical section of FIG. 6 taken on the line 7—7 in FIG. 6.

The embodiment 70 shown in FIGS. 6 and 7 is similar to the first embodiment shown in FIGS. 1 and 2 except that it uses a horizontally extending drum 71 and has a pair of diametrically spaced inlets 72 and a pair of stock outlets 73. The cleaning baffle and inlet baffle are combined as a single baffle 74. The filtrate is drained through the filtrate outlet 75 opening into the end of the drum 71.

FIFTH EMBODIMENTS, FIGS. 8 AND 9

Figure 9:
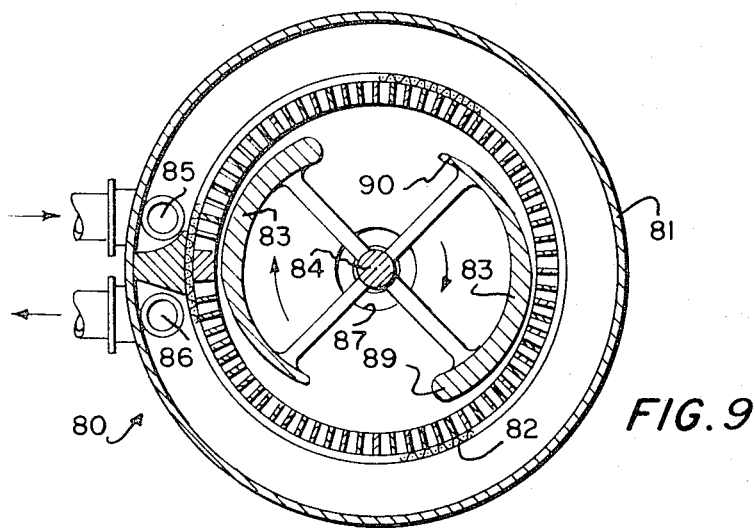
FIG. 9 is a horizontal section taken on line 9—9 in FIG. 8.
Figure 8:
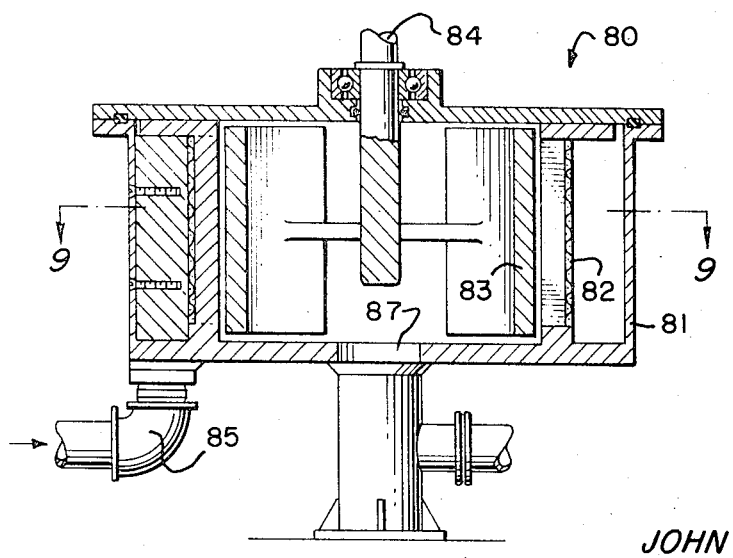
FIG. 8 is a vertical section of another embodiment.

The embodiment 80 shown in FIGS. 8 and 9 includes a stationary housing 81, a stationary circular screen 82 and a rotating pair of baffles 83 mounted on the rotary shaft 84. The stock may be supplied through the opening or inlet 85; and the thickened stock may be discharged through the opening or stock outlet 86. The filtrate separated from the stock is drained through the filtrate outlet 87.

The rotary baffles 83 are arranged to rotate in the direction of the arrows shown in FIG. 9. Each baffle 83 is divided into a leading portion 89 that serves as a screen cleaning means and a tail portion 90 that serves as an inlet control restrictor to prevent the stock from rushing at unduly high speed through the screen immediately following the cleaning of the screen 82 by the cleaning portion 89 of the baffle 83. In effect, each baffle 83 serves the same purpose as the arcuate walls 24 and 34 of the first embodiment shown in FIGS. 1 and 2.

Moreover, as will be understood, the opening 86 may be alternatively employed as the inlet for introducing stock to the housing 81 and the opening 85 used as the outlet or discharge. In this event, with the baffles 83 driven as aforedescribed their direction of movement is counter to the flow of stock circumferentially around the screen 82. Thus, during the movement of the baffles 83, the leading portions 89 dislodge the stock mat on the screen 82 by breaking the mat into fragments which are progressively propelled along the screen 82 towards the opening 85.

The embodiment 80 of FIGS. 8 and 9 does not have a specific cycle like the first embodiment. By this, we mean that the embodiment cleans the screen 82 continuously around its periphery, instead of only adjacent the stock outlet 86. However, it is much simpler in construction which may make it attractive to a prospective user.

Although several embodiments of the invention are specifically described, it should be noted that the invention may embrace other embodiments which are obvious from an understanding of the described embodiments and are embraced within the claims of the invention.

We claim:
1. An apparatus for dewatering or thickening a dilute liquid suspension of solid particles, such as pulp fibers, said apparatus comprising:
   a housing providing a substantially cylindrical chamber;
   a drum mounted in said cylindrical chamber in said housing and having a circumferentially extending screen;
   said screen having a size of perforations to allow filtrate to pass through it while barring solid material such as pulp fibers;
   an inlet on one side of said screen adapted to admit said liquid suspension to said one side of said screen;
   a stock outlet on said one side of said screen and spaced from said inlet for exhausting thickened stock from said housing;
   a filtrate outlet on the other side of said screen adapted to be connected to a reduced pressure relative to the pressure in said housing for exhausting liquid from said housing;
   screen cleaning means located on said other side of said screen with one of said screen and said screen cleaning means being movably mounted relative to the other, said screen cleaning means being operative to create a positive pressure on said other side of said screen relative to the pressure on said one side of said screen, to cause the liquid to reverse its normal flow through said screen for cleaning particles from said screen as such means relatively travels along said screen; and
   restrictor means controlling and limiting the flow of filtrate through said screen immediately following the cleaning of said screen to prevent said screen from becoming clogged to the extent that it cannot be cleaned by said screen cleaning means.

2. The apparatus of claim 1 wherein:
   said screen cleaning means is a baffle wall located on said other side of said screen with one of said screen and said baffle wall being rotatable relative to the other to partially trap liquid between said baffle wall and said screen for creating a positive pressure on said other side of said screen, relative to the pressure on said one side of said screen.

3. The apparatus of claim 2 wherein:
   said baffle wall extends along a path which substantially converges with said screen.

4. The apparatus of claim 3 wherein:
   said wall is curved in a direction similar to said screen.

5. The apparatus of claim 2 wherein:
   a series of radially extending partitions or dividers are mounted on said drum on said other side of said screen to cooperate with said baffle wall in trapping liquid between said baffle wall and said screen for creating said positive pressure.

6. The apparatus of claim 2 wherein:

said housing includes a pair of said stock outlets located in diametrically opposite portions of said housing relative to each other and a pair of filtrate outlets located in diametrically opposite portions of said housing relative to each other.

7. The apparatus of claim 2 wherein:

said one side of said screen is its outside wherein the filtrate normally flows inwardly through said screen from said inlet to said filtrate outlet.

8. The apparatus of claim 7 wherein:

said inlet and said stock outlet are positioned in the periphery of said cylindrical chamber of said housing; and said filtrate outlet is positoned in an end wall of said cylindrical chamber.

9. The apparatus of claim 1 wherein:

said one side of said screen is its inside wherein the filtrate normally flows outwardly through said screen from said inlet to said filtrate outlet.

10. The apparatus of claim 9 wherein:

said inlet and said stock outlet are positioned in an end wall of said cylindrical chamber; and said filtrate outlet is positioned in the periphery of said cylindrical chamber.

11. The apparatus of claim 1 wherein:

said screen cleaning means includes a series of spaced dividers mounted on the other side of said screen and a longitudinally slotted roller rolling on said other side of said screen with its slots engaging said dividers to form a positive displacement chamber between said roller and said screen to create said positive pressure.

12. The apparatus of claim 11 wherein:

said screen cleaning means includes means mounted adjacent said other side of said screen to apply a high pressure fluid jet against said other side of said screen.

13. The apparatus of claim 1 wherein:

said restrictor means includes a resistor wall located on the said other side of said screen and adjacent said screen with one of said screen and said restrictor wall mounted to rotate relative to the other.

14. The apparatus of claim 13 wherein:

said restrictor wall is shaped to allow the flow of filtrate through the screen to progressively increase following the cleaning of said screen.

15. The apparatus of claim 1 wherein:

said drum is rotatively mounted relative to said housing;

means is provided for rotating said drum;

said screen cleaning means being located adjacent said stock outlet; and said restrictor means being located adjacent said inlet.

16. The apparatus of claim 15 wherein:

said housing and inlet are shaped to cause said liquid suspension to flow from said inlet at a speed substantially equal to the peripheral speed of said drum.

17. The apparatus of claim 15 wherein:

said screen cleaning means is a baffle wall located on the other side of said screen adjacent said stock outlet and fixed to said housing; and said restrictor means is a restrictor wall located on said other side of said screen adjacent to said inlet and fixed to said housing.

18. The apparatus of claim 17 wherein:

said screen cleaning baffle wall is located on the inside of said drum and extends along a path converging with said screen in the direction of rotation of said drum; and said restrictor wall is located on the inside of said drum and extends along a path diverging from said screen in the direction of rotation of said drum.

19. The apparatus of claim 18 including:

a third wall interconnecting said baffle wall and said restrictor wall.

20. The apparatus of claim 19 wherein:

said baffle wall, restrictor wall and third wall are formed by a continuous surface.

21. The apparatus of claim 18 wherein:

said housing forms a chamber circling said drum that progressively enlarges in cross-sectional area proceeding from said inlet to said stock outlet.

22. The apparatus of claim 21 wherein:

said chamber has an involute shape.

23. The apparatus of claim 21 wherein:

said chamber has a cross-sectional area determined to cause the suspension flowing into said chamber from said inlet to flow at a speed substantially equal to the peripheral speed of said screen.

References Cited

UNITED STATES PATENTS

| 2,283,495 | 5/1942 | Evans | 210—392 |
| 3,241,677 | 3/1966 | Neuville et al. | 210—77 |

SAMIH N. ZAHARNA, *Primary Examiner.*

U.S. Cl. X.R.

209—270, 288; 210—402

PO-1050
(5/69)

UNITED STATES PATENT OFFICE
CERTIFICATE OF CORRECTION

Patent No. 3,452,875　　　　　　　Dated July 1, 1969

Inventor(s) J. P. RICH ET AL

It is certified that error appears in the above-identified patent and that said Letters Patent are hereby corrected as shown below:

Column 3, line 56, "bady" should read----badly----.

Column 4, line 25, "Uutimately" should read----Ultimately--

Column 7, lines 36 through 40, cancel claim 12.

SIGNED AND
SEALED
NOV 18 1969

(SEAL)
Attest:

Edward M. Fletcher, Jr.
Attesting Officer

WILLIAM E. SCHUYLER, JR.
Commissioner of Patents